(12) United States Patent
Peers-Smith

(10) Patent No.: US 10,978,803 B2
(45) Date of Patent: Apr. 13, 2021

(54) COMMUNICATIONS SYSTEM

(71) Applicant: Kirintec Limited, Herefordshire (GB)

(72) Inventor: Roy Peers-Smith, Herefordshire (GB)

(73) Assignee: Kirintec Limited, Herefordshire (GB)

( * ) Notice: Subject to any disclaimer, the term of this patent is extended or adjusted under 35 U.S.C. 154(b) by 116 days.

(21) Appl. No.: 16/021,858

(22) Filed: Jun. 28, 2018

(65) Prior Publication Data

US 2019/0006760 A1    Jan. 3, 2019

(30) Foreign Application Priority Data

Jun. 28, 2017 (GB) ..................................... 1710304

(51) Int. Cl.

| H01Q 1/48 | (2006.01) |
|---|---|
| H01Q 9/20 | (2006.01) |
| H04B 13/02 | (2006.01) |
| H04B 1/44 | (2006.01) |
| H01Q 1/04 | (2006.01) |
| H04B 1/48 | (2006.01) |

(Continued)

(52) U.S. Cl.
CPC .................. *H01Q 9/20* (2013.01); *H01Q 1/04* (2013.01); *H01Q 1/38* (2013.01); *H01Q 1/48* (2013.01); *H01Q 5/47* (2015.01); *H04B 1/44* (2013.01); *H04B 1/48* (2013.01); *H04B 13/02* (2013.01)

(58) Field of Classification Search
CPC .. H01Q 1/38; H01Q 1/48; H01Q 5/47; H01Q 9/20; H01Q 1/04; H04B 13/02; H04B 1/04; H04B 1/0458; H04B 1/44; H04B 1/48; G11C 16/04; G11C 16/0441; G11C 16/0483; G11C 16/08; G11C 16/14; G11C 16/24; G11C 7/18

See application file for complete search history.

(56) References Cited

U.S. PATENT DOCUMENTS

| 3,305,771 A | * | 2/1967 | Arps | ........................ | G01V 3/28 |
|---|---|---|---|---|---|
| | | | | | 324/342 |
| 4,511,843 A | * | 4/1985 | Thoraval | .................. | G01V 3/30 |
| | | | | | 324/338 |

(Continued)

FOREIGN PATENT DOCUMENTS

| CN | 101494509 B | 7/2009 |
|---|---|---|
| FR | 2561395 A1 | 9/1985 |

(Continued)

*Primary Examiner* — Tho G Phan
(74) *Attorney, Agent, or Firm* — DeLio Peterson & Curcio LLC; Thomas E. Ciesco

(57) ABSTRACT

A communications system is described which comprises a transmission unit including a transmission circuit 12 operable to output a transmission signal to a ground antenna 22 driven, in use, into a ground formation, and an impedance adjusting unit 20 electrically connected between the transmission circuit 12 and the antenna 22 and operable to adjust the transmission output impedance. A ground antenna 22 is also described comprising a single rod or stake including a first active section 30, a second active section 32 spaced apart from the first section 30 and collinear or coaxial therewith, and an insulating section 34 located between the first and second sections 30, 32, holding the first and second sections 30, 32 in a spaced, collinear or coaxial relationship.

12 Claims, 1 Drawing Sheet

(51) Int. Cl.
*H01Q 5/47* (2015.01)
*H01Q 1/38* (2006.01)

(56) References Cited

U.S. PATENT DOCUMENTS

| | | | | |
|---|---|---|---|---|
| 4,536,714 | A | * 8/1985 | Clark | ............... H01Q 1/52 |
| | | | | 324/338 |
| 4,899,112 | A | 2/1990 | Clark | |
| 5,892,361 | A | * 4/1999 | Meyer, Jr. | ............... G01V 3/30 |
| | | | | 324/338 |
| 8,325,097 | B2 | * 12/2012 | McKinzie | ............ H01Q 9/0421 |
| | | | | 343/703 |
| 8,736,264 | B2 | 5/2014 | Walsh | |
| 8,860,526 | B2 | * 10/2014 | Manssen | ................ H03H 7/40 |
| | | | | 333/17.3 |
| 9,379,454 | B2 | 6/2016 | Manssen et al. | |
| 9,847,807 | B2 | * 12/2017 | Zhu | ................ H03H 7/38 |
| 2008/0272981 | A1 | 11/2008 | Gagne | |
| 2012/0019420 | A1 | * 1/2012 | Caimi | ................ H01Q 1/243 |
| | | | | 343/702 |
| 2013/0093422 | A1 | 4/2013 | Morys | |

FOREIGN PATENT DOCUMENTS

| | | | |
|---|---|---|---|
| GB | 1382257 | A | 1/1975 |
| WO | 2006015402 | A1 | 2/2006 |
| WO | 2010141782 | A1 | 12/2010 |

\* cited by examiner

COMMUNICATIONS SYSTEM

BACKGROUND OF THE INVENTION

1. Field of the Invention

This invention relates to a communications system, and in particular to a communications system in which electromagnetic signals are transmitted through the ground.

2. Description of Related Art

Ground communications systems are used in, for example, mining or caving applications to allow communication between locations spaced apart from one another within a mine or cave, or between subterranean locations and surface locations.

In one form of cave radio system in common use, a transmitting loop in the form of a number of turns of, for example, copper wire is arranged such that the loop is orientated horizontally. A radio signal is transmitted using the loop, the signal being transmitted at a low frequency, for example at a few kHz. A similar, and similarly orientated, receiving loop may be used to receive the transmitted signal at a location remote from the transmission location. Such a system may be used to transmit a signal over a distance in the region of a few hundred meters. It will be appreciated that in such an arrangement the signal propagates through the air within the cave. It may be used to provide communications between spaced subterranean locations, or between a subterranean location and a surface location.

An alternative communications system used in such applications is a so called through-the-earth system which uses the ground or rock strata or other formation material in which a mine is formed as the medium through which the signal propagates, in use. In such an arrangement a transmitting antenna is driven into the earth or rock at a transmission location and used in the transmission of a communications signal through the medium of the earth or rock or other ground formation material. A receiving antenna is driven into the earth or rock or other formation material at a remote location and is used to receive the transmitted signal. Where used in mining or caving applications, one or other, or both, of the transmission location and the remote location may be below the surface, for example in a cave or mine. It will be appreciated, however, that both the transmission location and the remote location may be at the surface, the earth or rock or other ground formation simply being used as the medium through which the signal propagates rather than transmitting the signal through the air.

One problem experienced in such through-the-earth arrangements is that the nature of the earth or rock or other ground formation material through which the signal is to be transmitted can impact upon the ability of a signal to be transmitted effectively between the transmission antenna and the receiving antenna. By way of example, the presence of relatively high impedance ground or rock materials can impact upon the ability of the system to operate reliably, and variations in impedance, whilst allowing communications to take place, can impact upon transmission efficiency and effectiveness through impedance matching issues. It is an object of the invention to provide a system in which the disadvantage is overcome or is of reduced effect.

In a typical through-the-earth transmission arrangement, the transmission antenna takes the form of a pair of separate antenna rods or stakes which must be driven into the ground formation, the rods being connected by connecting wires to the remainder of the system. Similarly, the receiving antenna may include a pair of rods or stakes that need to be driven into the ground formation. Whilst the need to drive a pair of rods or stakes into the ground formation may be possible to achieve where the transmission and/or receiving location are to be used for an extended period of time, in applications in which the equipment at the transmission and/or receiving location is to be set up temporarily, and needs to be set up quickly, the need to drive a pair of rods or stakes into the ground formation, and to handle lengths of cable connecting the rods or stakes to the remainder of the apparatus may be problematic. It is another object of the invention, therefore, to provide a communications system in which this disadvantage is overcome or is of reduced effect.

SUMMARY OF THE INVENTION

The present invention provides a ground communications system and a ground antenna according to the appended claims.

According to a first aspect of the invention there is provided a communications system comprising a transmission unit including a transmission circuit operable to output a transmission signal to a ground antenna driven, in use, into a ground formation, and an impedance adjusting unit electrically connected between the transmission circuit and the antenna and operable to adjust the transmission impedance.

The transmission unit may comprise a transceiver unit, and may further comprise a receiver circuit. A switch may be provided to selectively connect the impedance adjusting unit to either the transmission circuit or the receiving circuit.

The impedance adjusting unit preferably comprises a plurality of impedances and a switch unit operable to selectively connect one or more of the impedances between the transmission and/or receiving circuit and the antenna. It may further comprise a transmission power controller.

It will be appreciated that such an arrangement is advantageous in that by appropriate control over the impedance adjusting unit, the transmission impedance and/or power may be adjusted to allow improved impedance matching, adjusting to suit the impedance of the material through which the signal propagates, in use. Should the impedance of the material vary over time, then adjustment of the unit can accommodate such variations.

Whilst the antenna may take the form of a pair of rods or stakes interconnected with the remainder of the system by wires, the antenna preferably takes the form of a single rod or stake including a first active section, a second active section spaced apart from the first section and arranged collinearly or coaxially therewith, and an insulating section located between the first and second sections, holding the first and second sections in a spaced, collinear or coaxial relationship.

The insulating section may form a housing in which at least some of the other parts of the system are located. By way of example, the transmission and receiving circuits, or parts thereof, may be housed within the insulating section.

The invention further relates to a ground antenna comprising a single rod or stake including a first active section, a second active section spaced apart from the first section and collinear or coaxial therewith, and an insulating section located between the first and second sections, holding the first and second sections in a spaced, collinear or coaxial relationship.

The insulating section may form a housing in which at least some of the other parts of a communications system with which the antenna is used are located. By way of example, the transmission and/or receiving circuits of the system, or parts thereof, may be housed within the insulating section.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

The invention will further be described, by way of example, with reference to the accompanying drawings, in which.

DESCRIPTION OF THE EMBODIMENT(S)

Figure 1:
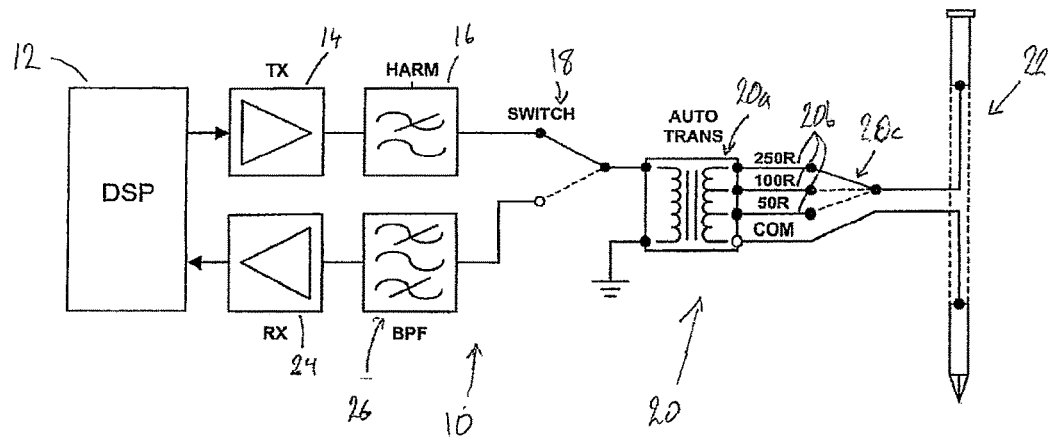
FIG. 1 is a diagram illustrating a communications system in accordance with an embodiment of the invention.

Referring firstly to FIG. 1, a communications system 10 is illustrated which comprises a signal processor unit 12 having an output connected to a transmission circuit 14. The output from the transmission circuit 14 is supplied, via a filter 16 and switch 18 to an impedance adjusting unit 20, and from the unit 20 to a ground antenna 22.

The system further comprises a receiving circuit 24 connected to the switch 18 via a band pass filter 26, an output from the receiving circuit 24 being supplied to the signal processing unit 12.

The adjusting unit 20 comprises a transformer 20a whereby the transmission power may be modified or controlled, a plurality of impedances 20b, and a switch unit 20c operable to switch in or out one or more of the impedances 20b between the output of the transformer 20a and the antenna 22 to adjust the transmission output impedance.

In use, two or more systems 10 of the type shown in FIG. 1 are positioned at locations spaced apart from one another, the ground antennae 22 of the systems 10 being driven substantially vertically into the ground material formations at the respective locations. The system 10 located at one of the locations is controlled in such a manner as to operate in a transmission mode, the other(s) of the systems 10 being set to a receive mode. In the transmission mode, the switch 18 is positioned or controlled to connect the transmission circuit 14 to the impedance adjustment unit 20 and antenna 22. In the receive mode, the switch 18 is positioned or controlled in such a manner that the antenna 22 and impedance adjustment unit 20 are connected to the receiving circuit 24.

The signal processing unit 12 and the transmission circuit 12 of the system 10 in the transmission mode are operated in such a manner that a test signal is transmitted by the antenna 22. The adjustment unit 20 operates to transmit the test signal at a default transmission power and impedance. The receiving circuit 24 and signal processing unit 12 of the system in the receive mode are operated in such a manner as to monitor for the reception of the test signal. If initially the test signal is not received, then the transmission power at which the signal is transmitted is gradually increased by adjustment of the operation of the transformer 20a of the unit 20 of the system 10 in the transmission mode. If the test signal is still not received then the unit 20 is operated to adjust the transmission output impedance. This is achieved through adjustment of the position of the switch 20c to switch in or out one or more of the impedances 20b. After adjustment of the transmission impedance, signal transmission is again undertaken starting at the default transmission power and gradually increasing the transmission power until either the test signal is received or the maximum transmission power is reached.

By cycling through the available transmission powers and output impedances, a transmission power and output impedance that results in reception of the signal at the or one of the other systems 10 can be identified. If desired, the system 10 may cycle through all available transmission power levels and output impedances to identify the settings that provide the optimum signal to noise ratio and once this procedure has been completed the system 10 may be set to the optimum transmission power and output impedance settings for subsequent signal transmissions between the systems 10 through the ground material formation in which the antennae 22 are installed. Once the transmission power and impedance level for one of the systems 10 has been identified, the process may be repeated for the other system(s) 10 to identify the optimum settings for each system 10 when transmitting to another of the systems 10 or receiving signals from another of the systems 10.

Figure 2:
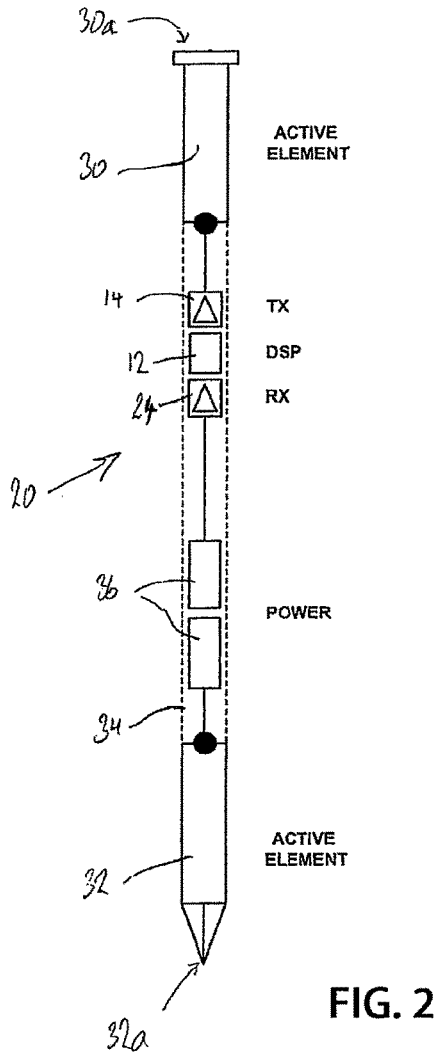
FIG. 2 is a diagram illustrating part of the communications system of FIG. 1; and, FIG. 3 illustrates a plurality of systems of the type shown in FIGS. 1 and 2, in use.

The antenna 22 of each system 10 could take the form of a pair of rods or stakes driven into the ground material formation, conveniently the antenna 22 of each system 10 takes the form shown in FIG. 2. As shown in FIG. 2, the antenna 22 comprises a single rod or stake comprising a first active section 30 and a second active section 32, the active sections 30, 32 being collinear or coaxial, ie lying upon the same axis as one another and spaced apart from one another, and held in a spaced relationship spaced apart along the axis by an insulating section 34. The insulating section 34 electrically insulates the first and second active sections 30, 32 from one another. As shown, the antenna 22 is shaped to form a stake which can be driven into the ground, the second section 32 being shaped to define a pointed region 32a to aid driving of the antenna 22 into the ground, and the first active section 30 including an enlarged head 30a to aid in using a suitable tool such as a hammer to drive the antenna 22 into the ground.

The insulating section 34 is hollow and defines a housing in which parts of the remainder of the system 10 may be located. By way of example, in the arrangement shown the signal processing unit 12, and transmission and receiving circuits 14, 24 are located within the housing defined by the insulating section 34. Although not illustrated, the switch 18 and unit 20 are conveniently also located within the housing defined by the insulating section 34 along with rechargeable batteries 36 or other power supplies, the appropriate parts of the circuits located within the housing defined by the insulating section 34 being electrically connected to first and second sections to allow the proper functioning of the antenna 22.

Such an arrangement is advantageous in that only a single rod or stake needs to be driven into the ground material formation in order to set up the system 10 for use. By housing parts of the system 10 within the insulating section 34, the system 10 can be of compact form and so be relatively convenient for handling and storage, no or fewer trailing wires extending from the antenna 22. Whilst using a single rod or stake as the antenna 22 may reduce antenna size and so impact upon antenna efficiency, by providing the system 10 with the impedance matching functionality described hereinbefore, at least some of the efficiency reductions arising from the use of a small antenna may be mitigated.

Figure 3:
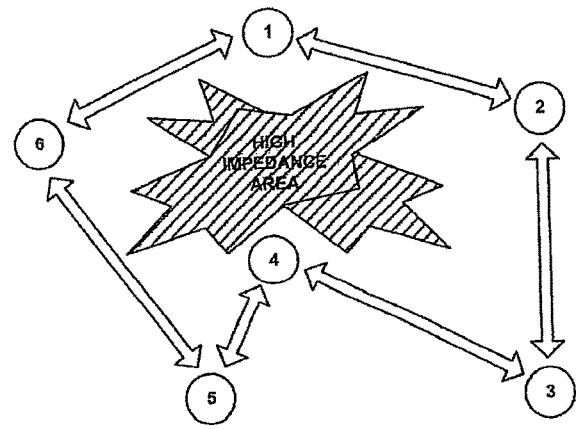

Although in the arrangement described hereinbefore the single rod or stake type antenna is used in a system 10 of the type permitting power and impedance adjustment or optimisation, it will be appreciated that at least some of the benefits of the invention may be achieved through the use of the single rod or stake type antenna of the type set out hereinbefore with a system having a fixed transmission power and/or impedance.

Where a plurality of systems 10 of the type described hereinbefore are used to provide communications between a number of locations as shown in FIG. 3, and it becomes apparent that the ground formation contains a region of high impedance between two or more of the systems 10 preventing or resisting direct communications between the systems 10 at those locations, the initialisation operation described hereinbefore in which the optimum transmission power and impedance is identified may be used to determine the ground impedance between each adjacent pair of systems 10. Where it is ascertained that direct communications between two or more of the systems 10 will not be possible or cannot be achieved in an acceptably efficient manner, then the systems 10 may be controlled in such a fashion that communications between certain of the systems 10 are routed via others of the systems 10. By way of example, the area 40 of high ground impedance may prevent efficient direct communications between the system 10 at location 4 and any of the systems 10 positioned at locations 1, 2 and 6. In such circumstances, communications between the systems 10 at, for example, locations 1 and 4 may be routed via the systems 10 at locations 2 and 3, for example. The selection of route may be made based upon the required transmission powers, for example selecting the route with the lowest transmission power, and hence best operating efficiency, or that with the best signal integrity. Which approach is taken in selecting the route may depend upon whether extending battery life or optimising transmitted data integrity is a priority.

It is envisaged that the systems 10 will be used to provide ground based communications between surface locations, using antennae 22 driven into the ground formation at the locations at which signals are required to be transmitted and/or received. It will be appreciated, however, that the invention is not restricted in this regard and may be used in applications in which signals are required to be transmitted between subterranean locations and/or between the surface and subterranean locations.

Thus, having described the invention, what is claimed is:

1. A ground communications system in which electromagnetic signals are transmitted through the ground between ground antenna, the system comprising: a ground antenna, a transmission unit including a transmission circuit operable to output a transmission signal to the ground antenna driven, in use, into a ground formation, and an impedance adjusting unit electrically connected between the transmission circuit and the ground antenna and operable to adjust the transmission output impedance and/or power to allow improved impedance matching to suit the impedance of the material through which the signal propagates, in use, wherein the ground antenna comprises a single stake.

2. A system as claimed in claim 1, wherein the antenna includes a first active section, a second active section spaced apart from the first section and arranged collinearly or coaxially therewith, and an insulating section located between the first and second sections, holding the first and second sections in a spaced, collinear or coaxial relationship.

3. A system according to claim 2, wherein the insulating section defines a housing in which at least some of the other parts of the system are located.

4. A system according to claim 3, wherein the transmission circuit is housed within the insulating section.

5. A system as claimed in claim 1, wherein the single stake includes a pointed region to aid driving of the antenna into the ground.

6. A system as claimed in claim 1 wherein the single stake includes a driving portion for engaging with a tool for driving the antenna into the ground.

7. A system as claimed in claim 6, wherein the antenna includes a first active section, a second active section spaced apart from the first section and arranged collinearly or coaxially therewith, and an insulating section located between the first and second sections, holding the first and second sections in a spaced, collinear or coaxial relationship wherein the driving portion is located on a terminal end of the antenna such that the first active section and second active section are located underneath the driving portion within the stake.

8. A system as claimed in claim 1, wherein the single stake is rigid.

9. A system according to claim 1, wherein the transmission unit comprises a transceiver unit, further comprising a receiver circuit.

10. A system according to claim 9, wherein a switch is provided to selectively connect the impedance adjusting unit to either the transmission circuit or the receiving circuit.

11. A system according to claim 1, wherein the impedance adjusting unit comprises a plurality of impedances and a switch unit operable to selectively connect one or more of the impedances between the transmission circuit and the antenna.

12. A system according to claim 1, wherein the impedance adjusting unit further comprises a transmission power controller.

* * * * *